US012800438B2

(12) United States Patent
Tanaka et al.

(10) Patent No.: US 12,800,438 B2
(45) Date of Patent: Nov. 17, 2026

(54) ENGINE-KNOCKING DETERMINING DEVICE AND METHOD

(71) Applicant: MITSUBISHI HEAVY INDUSTRIES ENGINE & TURBOCHARGER, LTD., Sagamihara (JP)

(72) Inventors: Kengo Tanaka, Tokyo (JP); Tomohiro Noguchi, Kanagawa (JP); Daisuke Takemoto, Tokyo (JP); Akihiro Yuki, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 295 days.

(21) Appl. No.: 18/838,448

(22) PCT Filed: Feb. 15, 2023

(86) PCT No.: PCT/JP2023/005135
§ 371 (c)(1),
(2) Date: Aug. 14, 2024

(87) PCT Pub. No.: WO2023/162805
PCT Pub. Date: Aug. 31, 2023

(65) Prior Publication Data

US 2025/0155322 A1 May 15, 2025

(30) Foreign Application Priority Data

Feb. 25, 2022 (JP) ................................ 2022-028177

(51) Int. Cl.
*G01M 15/08* (2006.01)
*G01M 15/11* (2006.01)

(52) U.S. Cl.
CPC ........... *G01M 15/08* (2013.01); *G01M 15/11* (2013.01)

(58) Field of Classification Search
CPC ............................. G01M 15/08; G01M 15/11
See application file for complete search history.

(56) References Cited

U.S. PATENT DOCUMENTS

| | | | |
|---|---|---|---|
| 6,289,720 | B1 | 9/2001 | Ohkubo et al. |
| 2006/0086177 | A1 | 4/2006 | Okubo et al. |

(Continued)

FOREIGN PATENT DOCUMENTS

| | | | |
|---|---|---|---|
| JP | 10-205386 | A | 8/1998 |
| JP | 2001032744 | A * | 2/2001 |

(Continued)

OTHER PUBLICATIONS

English translation of the International Search Report for International Application No. PCT/JP2023/005135, dated Apr. 25, 2023.

(Continued)

*Primary Examiner* — Eric S. McCall
(74) *Attorney, Agent, or Firm* — Birch, Stewart, Kolasch & Birch, LLP

(57) ABSTRACT

An engine-knocking determining device and method are provided for a pre-chamber engine that causes combustion by discharging flame in a pre-chamber into a main chamber. The engine-knocking determining device includes: a pressure amplitude acquiring unit that acquires pressure amplitudes of the main chamber; a section delimiting unit that delimits the pressure amplitudes acquired by the pressure amplitude acquiring unit into a first section prior to a maximum in-cylinder pressure and a second section subsequent to the maximum in-cylinder pressure; and a determining unit that determines whether knocking has occurred, by comparing a first maximum amplitude of the pressure amplitude in the first section with a second maximum amplitude of the pressure amplitude in the second section.

6 Claims, 7 Drawing Sheets

(56) References Cited

U.S. PATENT DOCUMENTS

| | | | | |
|---|---|---|---|---|
| 2009/0120164 | A1* | 5/2009 | Anilkumar ............ | G01M 15/08<br>73/35.08 |
| 2015/0184578 | A1* | 7/2015 | Oda ........................ | F02B 19/18<br>123/260 |
| 2019/0368410 | A1* | 12/2019 | Takemoto ............. | F02B 23/101 |
| 2020/0080467 | A1* | 3/2020 | Nomura .................. | F02B 19/10 |
| 2020/0208587 | A1 | 7/2020 | Yuuki et al. | |
| 2020/0325835 | A1 | 10/2020 | Youki et al. | |
| 2022/0049643 | A1* | 2/2022 | Ross ................... | F02B 19/1061 |

FOREIGN PATENT DOCUMENTS

| | | | |
|---|---|---|---|
| JP | 2006-183533 | A | 7/2006 |
| JP | 2012-31766 | A | 2/2012 |
| JP | 2017-129101 | A | 7/2017 |
| JP | 2020-45827 | A | 3/2020 |
| WO | WO 2019/082384 | A1 | 5/2019 |

OTHER PUBLICATIONS

International Search Report for International Application No. PCT/JP2023/005135, dated Apr. 25, 2023, with English translation.

* cited by examiner

ENGINE-KNOCKING DETERMINING DEVICE AND METHOD

FIELD

The present disclosure relates to an engine-knocking determining device and method.

BACKGROUND

In engines causing combustion using flame propagation, the pressure or temperature of unburned gas increases as the combustion progresses, and combustion due to spontaneous ignition, or what is called knocking, may occur before flame propagation. In the engine, knocking may cause a pressure wave in the combustion chamber, and members of the combustion chamber, such as a piston, may be damaged. At the same time, in order to improve the thermal efficiency of the engine, it is effective to advance the timing of ignition. However, as the timing of ignition is advanced, the chance of occurrence of knocking increases, and therefore, knocking becomes a limiting factor in the ignition timing advance. Hence, it is extremely important to make a highly accurate determination whether knocking has occurred in an engine.

One example of a conventional engine-knocking determining device is disclosed in Patent Literature 1 cited below. The knocking determining device disclosed in Patent Literature 1 applies filtering to the detected pressures in the cylinder, evaluates the amplitudes of the pressure (in-cylinder pressure), and determines that knocking has occurred when the pressure amplitude reaches a level equal to or higher than a control value.

CITATION LIST

Patent Literature

Patent Literature 1: Japanese Patent Application Laid-open No. H10-205386

SUMMARY

Technical Problem

A pre-chamber gas engine with a cylinder head provided with an ignition pre-chamber is known. In such pre-chamber engine, air-fuel mixture that is a mixture of fuel and air is supplied into the main-combustion chamber, and fuel is supplied to the pre-chamber. While a piston compresses the air-fuel mixture in the main-combustion chamber, the fuel in the pre-chamber is ignited by a spark plug, and thus flame is discharged into the main-combustion chamber, so that the flame ignites the air-fuel mixture in the main-combustion chamber and propagates therein. In such a pre-chamber gas engine, as the flame in the pre-chamber is discharged into the main-combustion chamber, the torch jet discharged generates a pressure wave. Therefore, when it is determined whether knocking has occurred, the pressure wave resultant of the torch jet discharged may affect the pressure amplitude as acoustic noise, and may cause an error in the determination of the occurrence of knocking.

The present disclosure is aimed to solve the problem described above, and an object of the present disclosure is to provide an engine-knocking determining device and method to improve knocking determination accuracy.

Solution to Problem

To achieve the above-described object, an engine-knocking determining device according to the present disclosure is for a pre-chamber engine that causes combustion by discharging flame in a pre-chamber into a main chamber, and includes: a pressure amplitude acquiring unit that acquires pressure amplitudes of the main chamber; a section delimiting unit that delimits the pressure amplitudes acquired by the pressure amplitude acquiring unit into a first section prior to a maximum in-cylinder pressure and a second section subsequent to the maximum in-cylinder pressure; and a determining unit that determines whether knocking has occurred, by comparing a first maximum amplitude of the pressure amplitude in the first section with a second maximum amplitude of the pressure amplitude in the second section.

Further, an engine-knocking determining method according to the present disclosure is for a pre-chamber engine that causes combustion by discharging flame in a pre-chamber into a main chamber, and includes the steps of: acquiring pressure amplitudes of the main chamber; delimiting the pressure amplitudes acquired into a first section prior to a maximum in-cylinder pressure and a second section subsequent to the maximum in-cylinder pressure; and determining whether knocking has occurred, by comparing a first maximum amplitude of the pressure amplitude in the first section with a second maximum amplitude of the pressure amplitude in the second section.

Advantageous Effects of Invention

With the engine-knocking determining device and method according to the present disclosure, it is possible to improve knocking determination accuracy.

DESCRIPTION OF EMBODIMENTS

Preferred embodiments of the present disclosure will now be explained in detail with reference to drawings. The embodiments are, however, not intended to limit the present disclosure, and when there are a plurality of embodiments, combinations thereof are also included in the present disclosure. Furthermore, elements described in the embodiment include those that can be easily thought of by those skilled in the art, those that are substantially identical thereto, and those falling within what is called the scope of equivalence.

First Embodiment

<Pre-Chamber Gas Engine>

Figure 1:
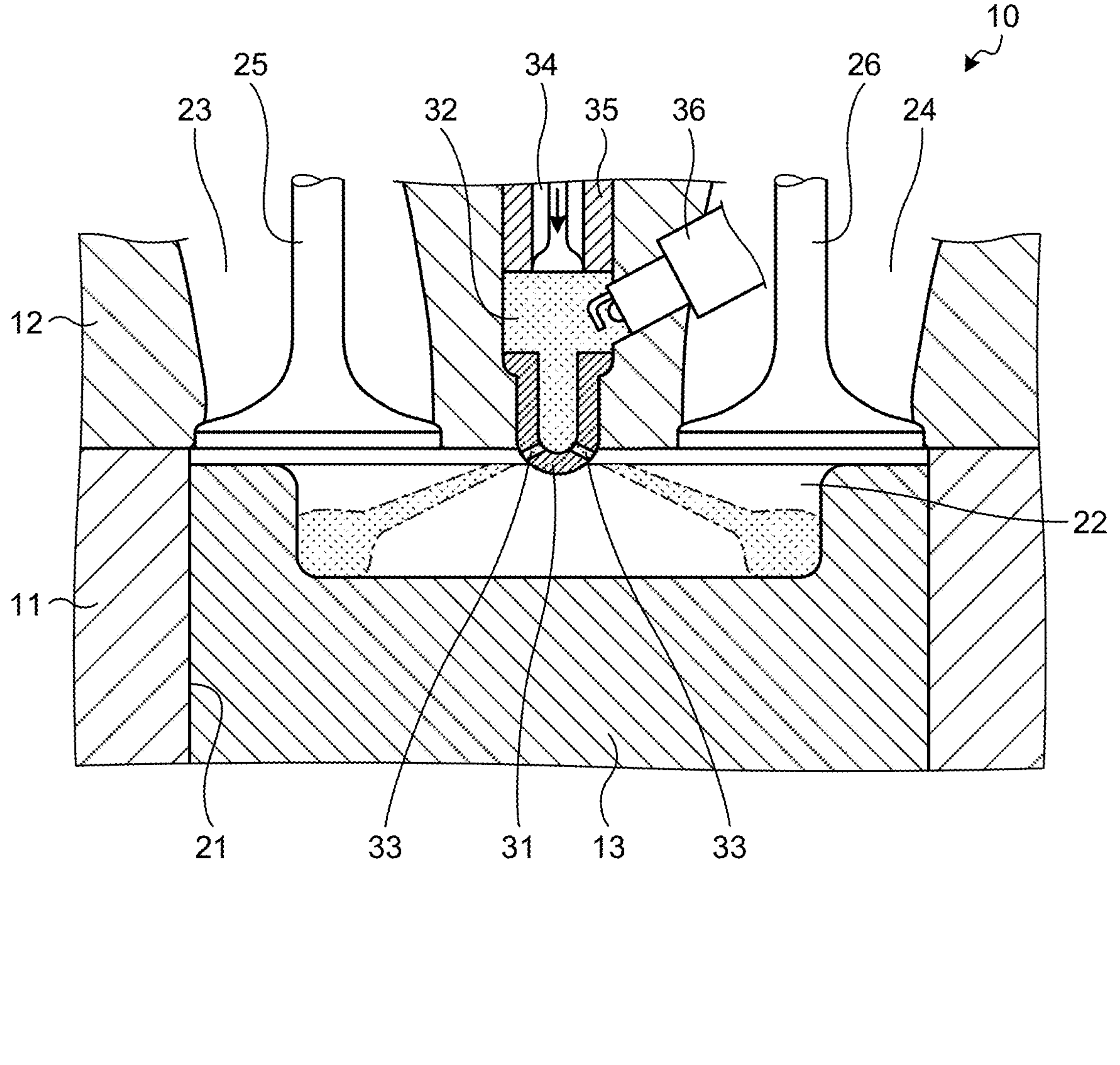
FIG. 1 is a schematic diagram illustrating an internal configuration of a pre-chamber gas engine.

FIG. 1 is a schematic diagram illustrating an internal configuration of a pre-chamber gas engine.

As illustrated in FIG. 1, an engine according to a first embodiment is a pre-chamber gas engine 10. In the description of the first embodiment, the engine is the pre-chamber gas engine 10, but the engine may be any engine of another type, as long as the engine has a main chamber and a pre-chamber. The pre-chamber gas engine 10 includes a cylinder block 11, a cylinder head 12, and a piston 13.

The cylinder block 11 has a block-like shape, and has a cylindrical space extending in the vertical direction. A cylinder liner 21 is fitted to the space. Along the horizontal direction of the cylinder block 11, a plurality of the spaces, although not illustrated, are provided at a certain interval. The cylinder head 12 is disposed on top of the cylinder block 11, and is fastened, with a plurality of bolts (not illustrated), to the cylinder block 11.

The piston 13 has a cylindrical shape, and is disposed in the cylinder liner 21 in the cylinder block 11, and supported movably in the axial direction. Although illustration is omitted, a crank shaft is rotatably supported on a component below the cylinder block 11 and is connected to the piston 14 via a connecting rod.

A main-combustion chamber (main chamber) 22 is a space defined by the inner circumferential surface of the cylinder liner 21 in the cylinder block 11, the bottom surface of the cylinder head 12, and the top surface of the piston 13. The cylinder head 12 is provided with an intake port 23 and an exhaust port 24, and one end of the intake port 23 and one end of the exhaust port 24 are connected to the main-combustion chamber 22. A bottom end of an intake valve 25 is disposed in the intake port 23, and a bottom end of an exhaust valve 26 is disposed in the exhaust port 24. The intake valve 25 and the exhaust valve 26 are supported by the cylinder head 12 in a manner movable in the axial direction, and are biased, by a biasing member (not illustrated), in the direction (upwards in FIG. 1) in which the intake valve 25 and the exhaust valve 26 close the intake port 23 and the exhaust port 24, respectively. By the actions of an intake cam and an exhaust cam, not illustrated, the intake valve 25 and the exhaust valve 26 open the intake port 23 and the exhaust port 24, respectively, so that the air-fuel mixture that is a mixture of fuel gas and air is supplied into the main-combustion chamber 22.

On the bottom surface of the cylinder head 12 that faces an upper part of the main-combustion chamber 22, a pre-chamber cap 31 is attached. The pre-chamber cap 31 is positioned at the center of the main-combustion chamber 22 in the radial direction, and protrudes into the main-combustion chamber 22. The pre-chamber cap 31 is provided with a pre-combustion chamber (pre-chamber) 32 therein, and has a plurality of orifices 33 formed on the part protruding into the main-combustion chamber 22, at some interval therebetween along the circumferential direction of the protruding part of the pre-chamber cap 31. The orifices 33 connect the pre-combustion chamber 32 to the main-combustion chamber 22.

The cylinder head 12 also includes a pre-chamber holder 34 fitted above the pre-chamber cap 31. The pre-chamber holder 34 has a cylindrical shape, and a pre-chamber gas valve 35 is disposed in the pre-chamber holder 34. The pre-chamber gas valve 35 is opened during the intake stroke to supply the fuel gas into the pre-combustion chamber 32. The cylinder head 12 also has a spark plug 36 fitted between the pre-chamber cap 31 and the pre-chamber holder 34. The spark plug 36 is capable of igniting the air-fuel mixture containing fuel supplied into the pre-combustion chamber 32.

The pre-chamber gas engine 10 goes through four strokes including an intake stroke, a compression stroke, a power stroke, and an exhaust stroke, while the crank shaft is rotated twice. During the strokes, an intake cam shaft and an exhaust cam shaft are rotated once and thereby the intake valve 25 and the exhaust valve 26 open and close the intake port 23 and the exhaust port 24, respectively. Once the air-fuel mixture is supplied through the intake port 23 into the main-combustion chamber 22, the piston 13 is moved up to compress the air-fuel mixture.

The pre-chamber gas valve 35 supplies fuel gas into the pre-combustion chamber 32. The spark plug 36 ignites the fuel gas supplied into the pre-combustion chamber 32. Thus the fuel gas in the pre-combustion chamber 32 is combusted, and thereby combustion gas is generated. The combustion gas in the pre-combustion chamber 32 is then discharged through the orifices 33 into the main-combustion chamber 22, as fire source (torch). The air-fuel mixture compressed in the main-combustion chamber 22 is combusted by the fire source from the pre-combustion chamber 32. The explosion load produced by the combustion pushes down the piston 13, and causes the crank shaft to rotate. The combustion gas generated in the main-combustion chamber 22 is then discharged as flue gas through the exhaust port 24.

<Knocking Determining Device>

Figure 2:
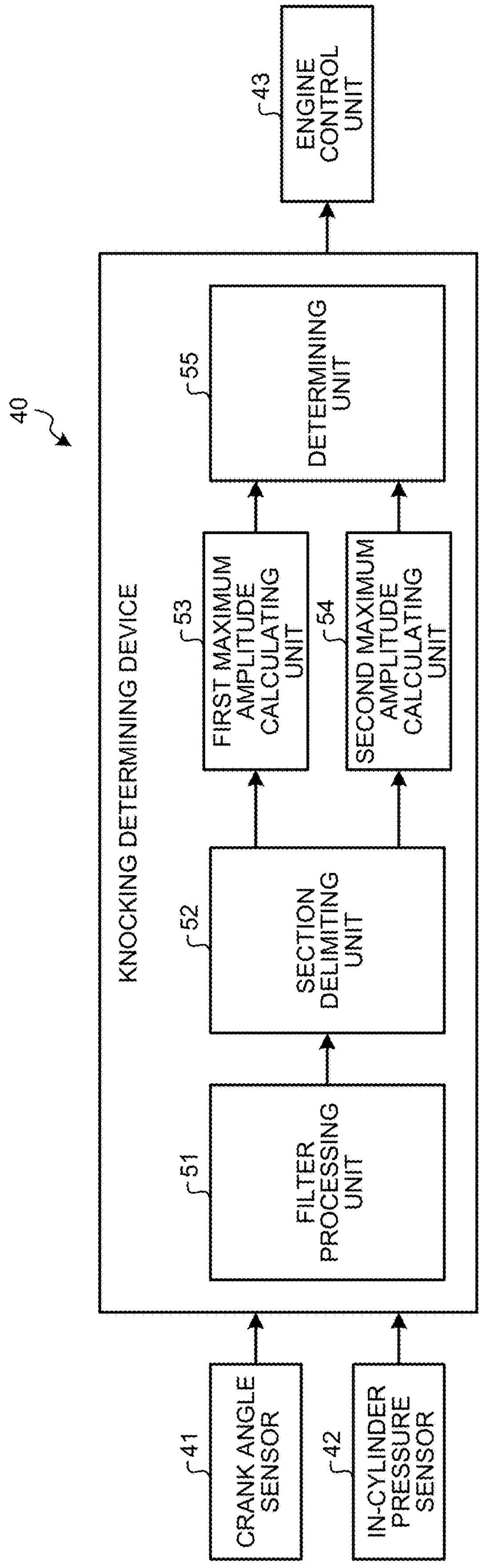
FIG. 2 is schematic diagram illustrating a configuration of an engine-knocking determining device according to a first embodiment.

FIG. 2 is schematic diagram illustrating a configuration of an engine-knocking determining device according to the first embodiment.

As illustrated in FIG. 2, to a knocking determining device 40, a crank angle sensor 41 and an in-cylinder pressure sensor 42 are connected. The crank angle sensor 41 detects the rotational angle of the crank shaft (a phase in 360 degrees), and outputs the rotational angle to the knocking determining device 40. In other words, the crank angle sensor 41 detects the rotational angle of the crank shaft with reference to a top dead center. For example, the crank shaft has a disk fixed thereto, the disk having a plurality of slits that are spaced apart from each other in the circumferential direction. An optical sensor or an electromagnetic sensor then detects the rotating disk, and outputs the crank position (rotational angle). The in-cylinder pressure sensor 42 detects the pressure in the main-combustion chamber 22 (hereinafter referred to as an in-cylinder pressure) (see FIG. 1), and outputs the pressure to the knocking determining device 40. One example of the in-cylinder pressure sensor 42 is a high-temperature piezoelectric pressure sensor mounted on the cylinder head.

The knocking determining device 40 is also connected to an engine control unit 43. The knocking determining device 40 outputs knocking determination result representing whether knocking has occurred in the pre-chamber gas engine 10 to the engine control unit 43. Based on the knocking determination result, the engine control unit 43 performs control such as the advance of ignition timing in the pre-chamber gas engine 10.

The knocking determining device 40 and the engine control unit 43 are control devices. The control devices serving as the knocking determining device 40 and the engine control unit 43 are controllers, and are implemented by causing a central processing unit (CPU) or a microprocessing unit (MPU) to execute various computer programs stored in a storage, using a RAM as a working area.

The knocking determining device 40 and the engine control unit 43 may also be implemented as one control device.

The knocking determining device 40 includes a filter processing unit (pressure amplitude acquiring unit) 51, a section delimiting unit 52, a first maximum amplitude calculating unit 53, a second maximum amplitude calculating unit 54, and a determining unit 55.

The filter processing unit 51 is a band-pass filter, and removes a low-frequency component and a high-frequency component from the in-cylinder pressure detected by the in-cylinder pressure sensor 42, using certain frequencies, to obtain the pressure amplitude at a particular frequency. In other words, the filter processing unit 51 acquires a temporal change in the amplitude of the pressure in the main-combustion chamber 22, with respect to the crank angle (time).

The section delimiting unit 52 delimits the changes of the amplitudes of the pressures in the main-combustion chamber 22 with respect to the crank angles acquired by the filter processing unit 51 into a first section and a second section. The first section herein is a temporal section prior to the maximum in-cylinder pressure, and the second section is a temporal section subsequent to the maximum in-cylinder pressure. The timing to start the first section is, for example, a timing prior to the start of combustion, and the timing to end the second section is a timing subsequent to the end of combustion. In other words, the first section is a period from a timing prior to the start of the combustion to a timing at which the maximum in-cylinder pressure is reached, and the second section is a period from the timing at which the maximum in-cylinder pressure is reached to a timing subsequent to the end of the combustion.

The first maximum amplitude calculating unit 53 calculates a first maximum amplitude, from the change in the amplitude of the pressure in the first section. In other words, the first maximum amplitude calculating unit 53 calculates the difference between the maximum in-cylinder pressure and the minimum in-cylinder pressure at the maximum amplitude in the first section, as the first maximum amplitude. The second maximum amplitude calculating unit 54 calculates a second maximum amplitude, from the change in the amplitude of the pressure in the second section. In other words, the second maximum amplitude calculating unit 54 calculates the difference between the maximum in-cylinder pressure and the minimum in-cylinder pressure at the maximum amplitude in the second section, as the second maximum amplitude. The amplitude herein is the difference between a peak and a valley (or valley and peak) that are adjacent to each other in a pressure waveform. The amplitude is not limited to such a difference, but may also be a difference between a peak or a valley prior to or subsequent to the boundary and the pressure at the boundary between the first section and the second section, for example.

The determining unit 55 determines whether knocking has occurred, by comparing the first maximum amplitude in the first section with the second maximum amplitude in the second section. In other words, the determining unit 55 determines that knocking has occurred when the ratio of the second maximum amplitude to the first maximum amplitude is greater than a preset ratio threshold.

<Knocking Determining Method>

Figure 3:
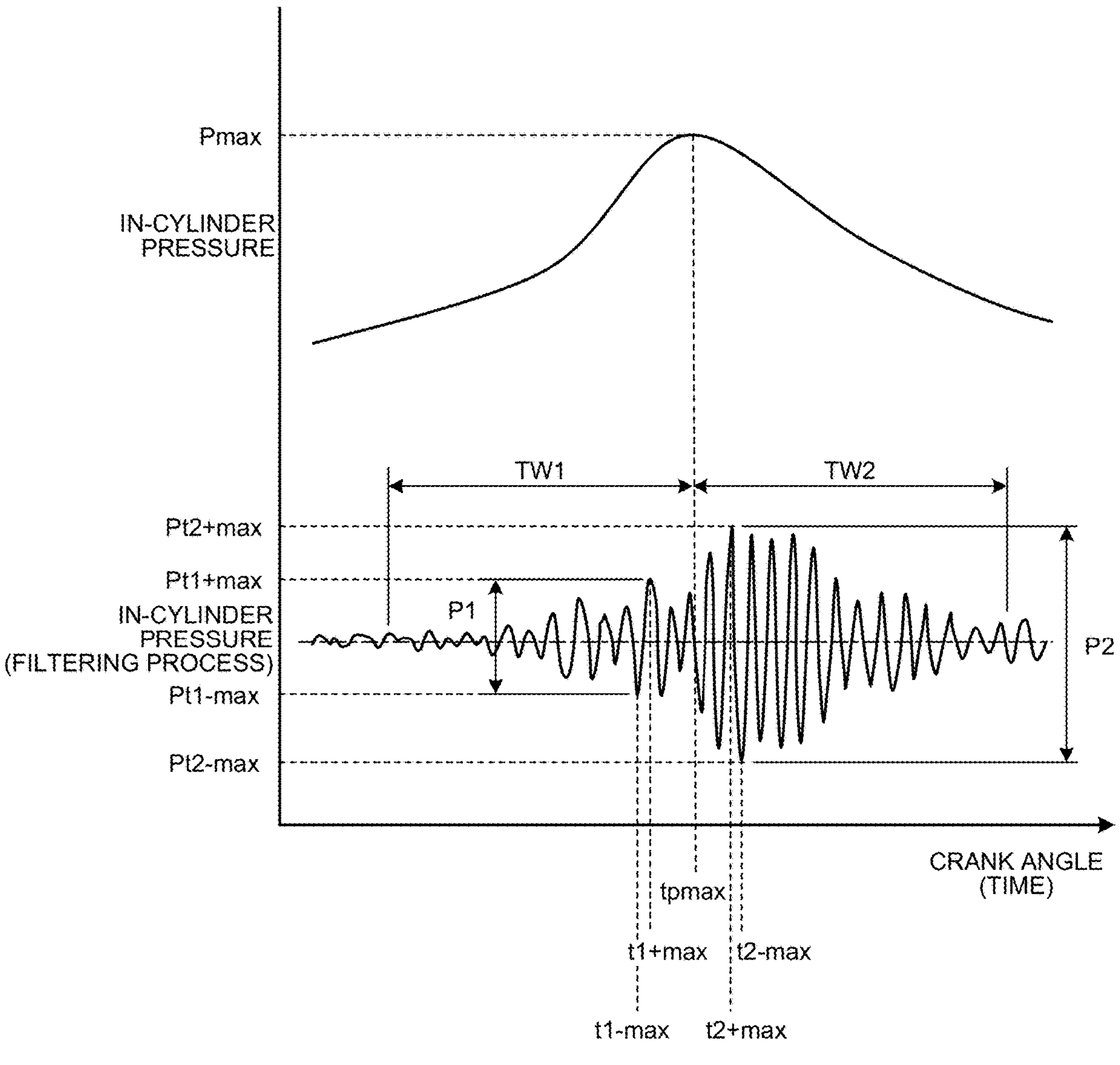
FIG. 3 is a graph indicating in-cylinder pressures with respect to crank angles.
Figure 4:
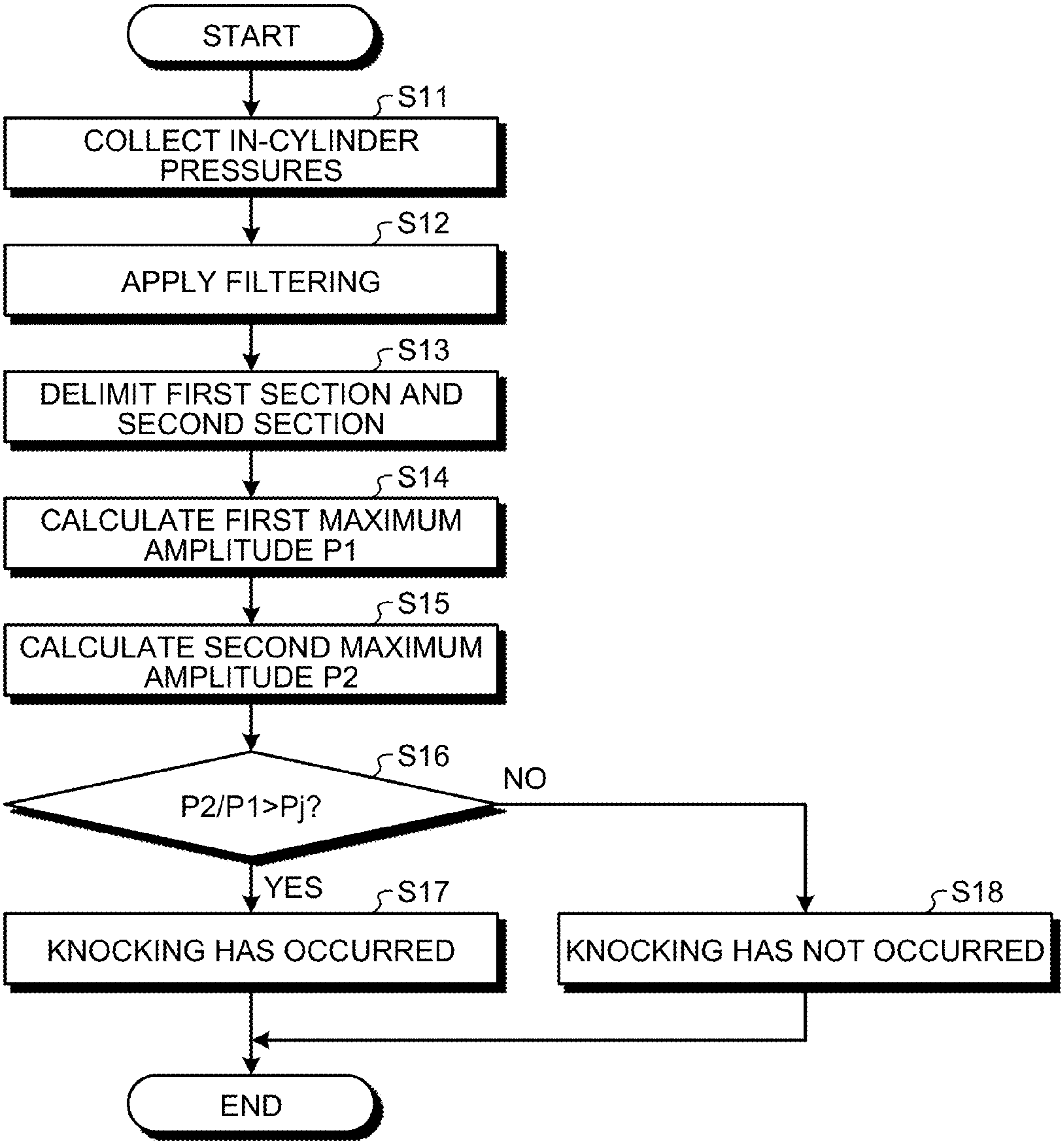
FIG. 4 is a flowchart illustrating an engine-knocking determining method.

FIG. 3 is a graph indicating the in-cylinder pressures with respect to the crank angles, and FIG. 4 is a flowchart illustrating an engine-knocking determining method.

The engine-knocking determining method according to the first embodiment includes: a step of acquiring pressure amplitudes of the main-combustion chamber 22; a step of delimiting the pressure amplitudes acquired into the first section and the second section, the first section being a section prior to the maximum in-cylinder pressure and the second section being a section subsequent to the maximum in-cylinder pressure; a step of determining whether knocking has occurred, by comparing a first maximum amplitude of the pressure amplitude in the first section with a second maximum amplitude of the pressure amplitude in the second section.

In FIG. 3, the solid line in the upper part represents the in-cylinder pressures detected by the in-cylinder pressure sensor 42, and the solid line in the lower part represents the amplitudes of the pressures in the main-combustion chamber obtained by processing the in-cylinder pressures with the filter processing unit 51.

The in-cylinder pressure reaches a maximum in-cylinder pressure Pmax at time (crank angle) tpmax. Therefore, a first section TW1 delimited by the section delimiting unit 52 corresponds to a period from a timing prior to the start of combustion to the time tpmax; and a second section TW2 corresponds to a period from the time tpmax to a timing subsequent to the end of the combustion. In other words, by delimiting the first section TW1 and the second section TW2, using the timing as a boundary at which the maximum in-cylinder pressure Pmax is reached, the pressure amplitudes in the first section TW1 come to represent vibrations without the effect of knocking, and the pressure amplitudes in the second section come to represent vibrations affected by knocking, when such knocking has occurred.

In the first section, a minimum in-cylinder pressure Pt1−max at the first maximum amplitude P1 is reached at time (crank angle) t1−max, and a maximum in-cylinder pressure Pt1+max at the first maximum amplitude P1 is reached at time (crank angle) t1+max. Therefore, the first maximum amplitude calculating unit 53 calculates the first maximum amplitude P1 by subtracting the minimum in-cylinder pressure Pt1−max from the maximum in-cylinder pressure Pt1+max, in the first section.

In the second section, a maximum in-cylinder pressure Pt2+max at the second maximum amplitude P2 is reached at time (crank angle) t2+max, and a minimum in-cylinder pressure Pt2−max at the second maximum amplitude P2 is reached at time (crank angle) t2−max. Therefore, the second maximum amplitude calculating unit 54 calculates the second maximum amplitude P2 by subtracting the minimum in-cylinder pressure Pt2−max from the maximum in-cylinder pressure Pt2+max in the second section.

The determining unit 55 determines whether knocking has occurred, by comparing the first maximum amplitude P1 in the first section TW1 with the second maximum amplitude P2 in the second section TW2. In other words, the determining unit 55 determines that knocking has occurred when P2/P1 that is the ratio of the second maximum amplitude P2 to the first maximum amplitude P1 is greater than a ratio threshold Pj. In other words, the determining unit 55 determines that knocking has occurred when the second maximum amplitude P2 in the second section is too large.

The method for determining the occurrence of knocking will now be explained specifically. As illustrated in FIGS. 2 and 4, at Step S11, the knocking determining device 40 collects the in-cylinder pressures detected by the in-cylinder pressure sensor 42. At Step S12, the filter processing unit 51 applies filtering to the in-cylinder pressures to calculate the pressure amplitudes of the main-combustion chamber 22 with respect to the crank angle (time).

At Step S13, the section delimiting unit 52 delimits the first section TW1 and the second section TW2 using the time (crank angle) tpmax as a boundary at which the maximum in-cylinder pressure Pmax is reached. At Step S14, the first maximum amplitude calculating unit 53 calculates the first maximum amplitude P1 in the first section by subtracting the minimum in-cylinder pressure Pt1−max at the first maximum amplitude P1 from the maximum in-cylinder pressure Pt1+max at the first maximum amplitude P1. At Step S15, the second maximum amplitude calculating unit 54 calculates the second maximum amplitude P2 in the second section by subtracting the minimum in-cylinder pressure Pt2−max at the second maximum amplitude P2 from the maximum in-cylinder pressure Pt2+max at the second maximum amplitude P2.

At Step S16, the determining unit 55 determines whether knocking has occurred, by comparing the first maximum amplitude P1 in the first section TW1 with the second maximum amplitude P2 in the second section TW2. In other words, the determining unit 55 determines whether P2/P1 that is the ratio of the second maximum amplitude P2 to the first maximum amplitude P1 is greater than the ratio threshold Pj (e.g., 1.3). If the determining unit 55 determines that P2/P1 that is the ratio of the second maximum amplitude P2 to the first maximum amplitude P1 is greater than the ratio threshold Pj (Yes), the determining unit 55 determines that knocking has occurred, at Step S17. By contrast, if the determining unit 55 determines that P2/P1 that is the ratio of the second maximum amplitude P2 to the first maximum amplitude P1 is not greater than the ratio threshold Pj (No), the determining unit 55 determines that no knocking has occurred, at Step S18.

Second Embodiment

Figure 5:
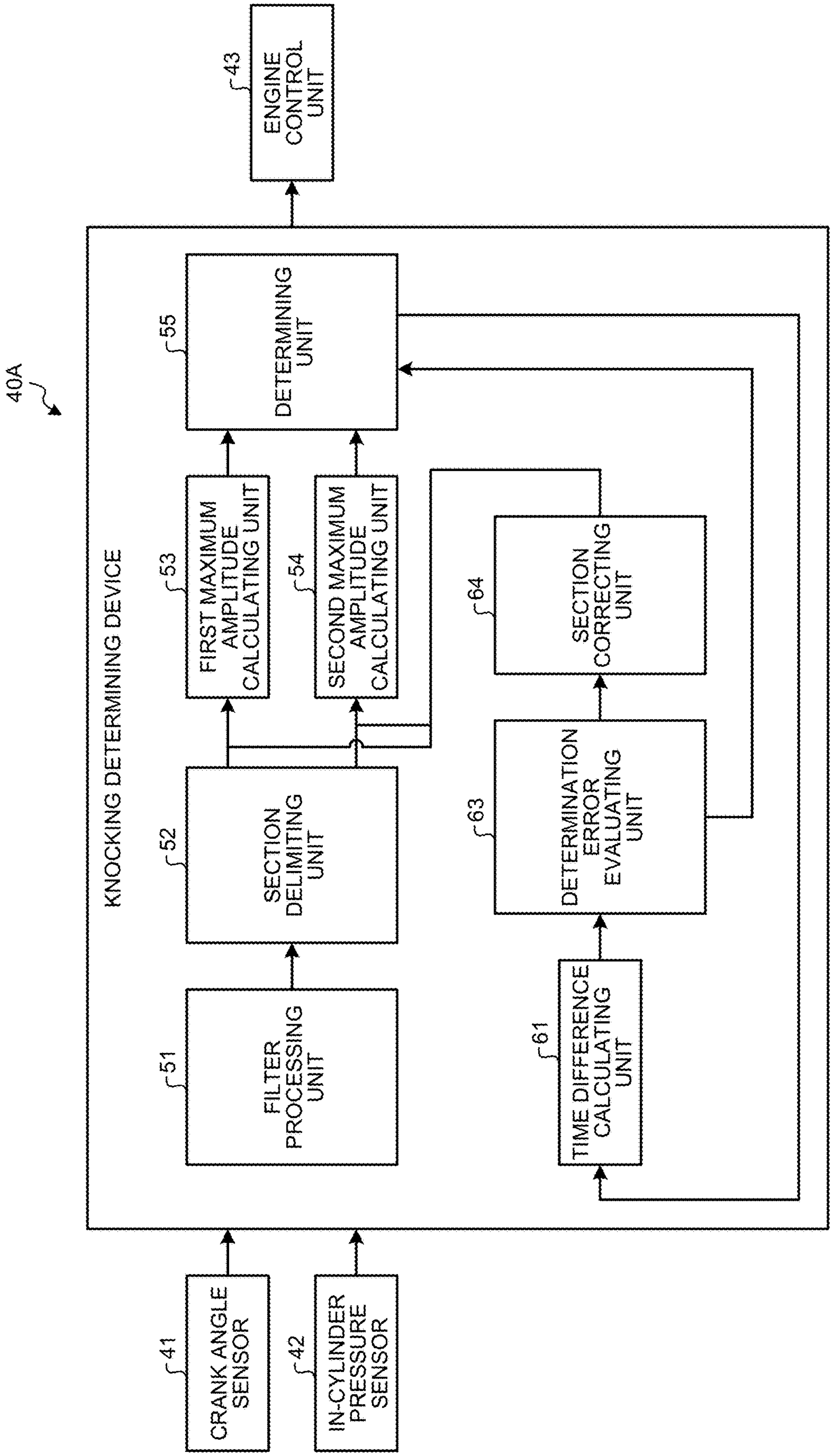
FIG. 5 is a schematic diagram illustrating a configuration of an engine-knocking determining device according to a second embodiment.

FIG. 5 is schematic diagram illustrating a configuration of an engine-knocking determining device according to a second embodiment. Members having similar functions as those described in the first embodiment are given the same reference signs, and the detailed description thereof is omitted.

As illustrated in FIG. 1, in the pre-chamber gas engine 10, the combustion gas in the pre-combustion chamber 32 is discharged as fire source into the main-combustion chamber 22, so that the air-fuel mixture compressed in the main-combustion chamber 22 is combusted. In the main-combustion chamber 22, sometimes the air-fuel mixture ignites spontaneously before the frame spreads and knocking occurs. In such a case, knocking might occur before the in-cylinder pressure reaches the maximum value. In the second embodiment, knocking determination errors are suppressed by correcting the periods corresponding to the first section and the second section, when it is expected that knocking occurs at an earlier timing.

As illustrated in FIG. 5, a knocking determining device 40A includes a time difference calculating unit 61, a determination error evaluating unit 63, and a section correcting unit 64, in addition to the filter processing unit 51, the section delimiting unit 52, the first maximum amplitude calculating unit 53, the second maximum amplitude calculating unit 54, and the determining unit 55.

The time difference calculating unit 61 calculates the difference in time, that is, a time difference, between the timing at which the maximum in-cylinder pressure in the first section is reached and the timing at which the maximum in-cylinder pressure in the second section is reached.

When the determining unit 55 determines that no knocking has occurred, if the determination error evaluating unit 63 determines that the absolute value of the time difference is smaller than a time difference threshold, the determination error evaluating unit 63 evaluates that the determination that no knocking has occurred may be an error. In such a case, the section correcting unit 64 corrects the first section and the second section.

In such a case, the determination error evaluating unit 63 sets the time difference threshold to a half to the whole of the time difference between the timings of the maximum in-cylinder pressure and the minimum in-cylinder pressure when the pressure amplitude becomes the maximum, across the entire section including the first section and the second section. In other words, the time difference threshold is a control value between a half and the whole of the absolute value of the subtraction of the time of the minimum in-cylinder pressure from the time of the maximum in-cylinder pressure. In other words, the time difference threshold corresponds to ¼ cycle to ½ cycle of the pressure.

The section correcting unit 64 corrects the position of the boundary between the first section and the second section on the basis of the time difference threshold (the control value corresponding to a ¼ cycle to a ½ cycle of the pressure waveform), without changing the interval widths of the first section and the second section. It is preferable that the section correcting unit 64 shift the position of the boundary between the first section and the second section toward the first section by the time difference threshold (the control value corresponding to a ¼ cycle to a ½ cycle of the pressure waveform), but the section correcting unit 64 is not limited by this method. The section correcting unit 64 may shift the position of the boundary between the first section and the second section toward the first section, within the range between ¼ the cycle of the pressure waveform and ½ the cycle of the pressure waveform.

Once the first section and the second section are corrected by the section correcting unit 64, the processes of the first maximum amplitude calculating unit 53, the second maximum amplitude calculating unit 54, and the determining unit 55 are performed again.

Figure 6:
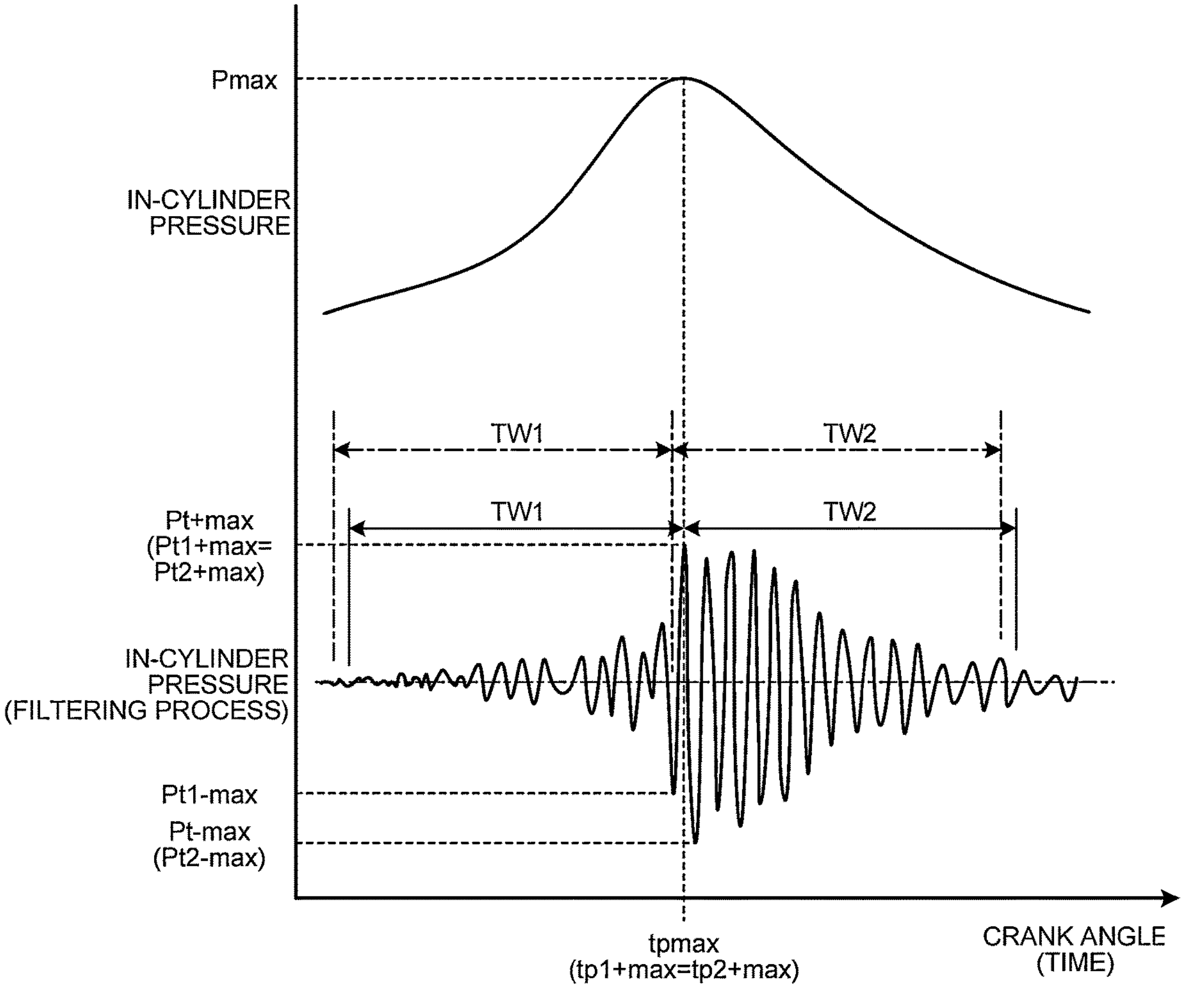
FIG. 6 is a graph indicating in-cylinder pressures with respect to crank angles.
Figure 7:
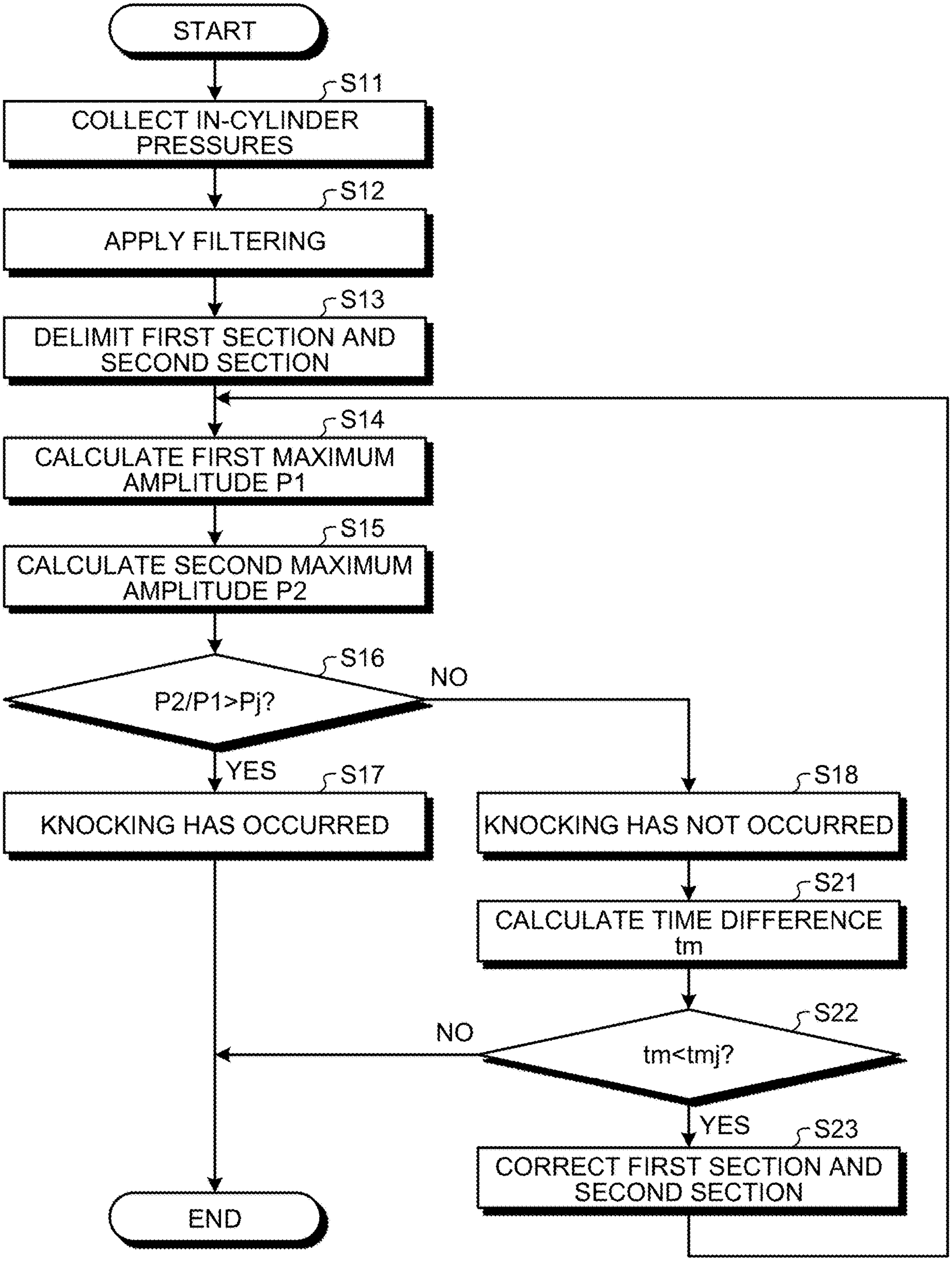
FIG. 7 is a flowchart illustrating an engine-knocking determining method.

FIG. 6 is a graph indicating the in-cylinder pressures and a heat release rate with respect to the crank angles, and FIG. 7 is a flowchart illustrating an engine-knocking determining method.

In FIG. 6, the solid line in the upper part represents in-cylinder pressures detected by the in-cylinder pressure sensor 42; the solid line in the middle part represents a heat release rate of the main-combustion chamber, the heat release rate being calculated from the in-cylinder pressures; and the solid line in the lower part represents pressures in the main-combustion chamber obtained by processing the in-cylinder pressures with the filter processing unit 51.

The in-cylinder pressure reaches the maximum in-cylinder pressure Pmax at the time (crank angle) tpmax; therefore, the first section TW1 delimited by the section delimiting unit 52 corresponds to a period from a timing prior to the start of combustion to the time tpmax, and the second section TW2 corresponds to a period from the time tpmax to a timing subsequent to the end of combustion.

When the knocking occurs at an earlier stage, the maximum in-cylinder pressure Pt1+max in the first section TW1 becomes the same as the maximum in-cylinder pressure Pt2+max in the second section TW2. Therefore, the time difference calculating unit 61 calculates the absolute value of the difference in time, that is, a time difference tm between the time tp1+max at which the maximum in-cylinder pressure Pt1+max in the first section is reached and the time tp2+max at which the maximum in-cylinder pressure in the second section is reached (|tp2max+tp1+max|).

When the determining unit 55 determines that no knocking has occurred, if the determination error evaluating unit 63 determines that the time difference tm is smaller than a time difference threshold tmj, the determination error evaluating unit 63 evaluates that the determination that no knocking has occurred may be an error. In other words, if the time tp1+max at which the maximum in-cylinder pressure Pt1+max in the first section is reached is the same time as the time tp2+max at which the maximum in-cylinder pressure Pt2+max in the second section is reached, the time difference calculating unit 61 derives the time difference tm=0. Therefore, the determination error evaluating unit 63 determines that the time difference tm is smaller than time difference threshold tmj, and evaluates that the determination that no knocking has occurred may be an error.

In such a case, the determination error evaluating unit 63 sets the time difference threshold tmj to a half to the whole of the time difference twm between the time of the maximum in-cylinder pressure Pt+max and the time of the minimum in-cylinder pressure Pt-max when the pressure amplitude is maximum across the entire section including the first section TW1 and the second section TW2. The section correcting unit 64 then shifts the position of the boundary between the first section and the second section toward the first section TW1, by the time difference threshold (the control value corresponding to a ¼ cycle to a ½ cycle of the pressure) tmj, as indicated by the long dashed short dashed line in FIG. 6.

The method for determining the occurrence of knocking will now be explained specifically. As illustrated in FIGS. 2 and 7, the processes from Step S11 to Step S17 are the same as those in the first embodiment.

At Step S16, if the determining unit 55 determines that P2/P1 that is the ratio of the second maximum amplitude P2 to the first maximum amplitude P1 is not greater than the ratio threshold Pj (No), the determining unit 55 determines that no knocking has occurred, at Step S18. However, the determination that no knocking has occurred may be an error. Therefore, at Step S21, the time difference calculating unit 61 calculates the absolute value of the difference in time, that is, the time difference tm, between time tp1+max at which the maximum in-cylinder pressure Pt1+max in the first section is reached and the time tp2+max at which the maximum in-cylinder pressure Pt2+max in the second section is reached.

At Step S22, the determination error evaluating unit 63 determines whether the time difference tm is shorter than the time difference threshold tmj. If the determination error evaluating unit 63 determines that the time difference tm is not shorter than the time difference threshold tmj (No), the determination of the occurrence of knocking is regarded as correct, and the processing exits the routine. By contrast, if the determination error evaluating unit 63 determines that the time difference tm is shorter than the time difference threshold tmj (Yes), the determination of the occurrence of knocking is regarded as incorrect, and the processing goes to Step S23. At Step S23, the section correcting unit 64 shifts the position of the boundary between the first section and the second section toward the first section TW1, by the time difference threshold (the control value corresponding to a ¼ cycle to a ½ cycle of the pressure waveform) tmj, without changing the interval widths of the first section and the second section.

After the section correcting unit 64 corrects the first section and the second section at Step S23, the processing goes back to Step S14, and the processes at Step S14 and thereafter are repeated.

[Actions and Effects Achieved by Embodiment]

An engine-knocking determining device according to a first aspect included in a pre-chamber gas engine 10 that causes combustion by discharging flame in a pre-combustion chamber (pre-chamber) 32 into a main-combustion chamber 22 includes: a filter processing unit (pressure amplitude acquiring unit) 51 that acquires pressure amplitudes of the main-combustion chamber (main chamber) 22; a section delimiting unit 52 that delimits the pressure amplitudes acquired by the filter processing unit 51 into a first section prior to a maximum in-cylinder pressure and a second section subsequent to the maximum in-cylinder pressure; and a determining unit 55 that determines whether knocking has occurred, by comparing a first maximum amplitude of the pressure amplitude in the first section with a second maximum amplitude of the pressure amplitude in the second section.

With the engine-knocking determining device according to the first aspect, the section delimiting unit 52 delimits the first section and the second section using the timing as a boundary at which the maximum in-cylinder pressure is reached. In other words, the pressure amplitudes in the first section represent vibrations without the effect of knocking, and the pressure amplitudes in the second section represent vibrations affected by knocking, when such knocking has occurred. By comparing the first maximum pressure amplitude of the pressure amplitude in the first section with the second maximum pressure amplitude of the pressure amplitude in the second section, the determining unit 55 can determine that knocking has occurred appropriately, with the effects of the torch jet removed from the first section and the second section. As a result, it is possible to improve knocking determination accuracy.

In an engine-knocking determining device according to a second aspect, the determining unit 55 determines that knocking has occurred, when a ratio between the first maximum amplitude and the second maximum amplitude is greater than a preset ratio threshold. In this manner, it becomes possible to easily determine the occurrence of knocking.

An engine-knocking determining device according to a third aspect includes a section correcting unit 64 that corrects the first section and the second section in a case where a time difference between a timing at which the maximum in-cylinder pressure in the first section is reached and a timing at which the maximum in-cylinder pressure in the second section is reached is shorter than a preset time difference threshold when the ratio between the first maximum amplitude and the second maximum amplitude in the first section or the second section is equal to or lower than an amplitude threshold. In this manner, because the section correcting unit 64 corrects the first section and the second section even during an engine operation in which knocking occurs at an early stage, it is possible to determine the occurrence of knocking highly accurately.

In an engine-knocking determining device according to a fourth aspect, the time difference threshold is set to ½ a time difference between a timing of the maximum in-cylinder pressure and a timing of the minimum in-cylinder pressure when the pressure amplitude becomes the maximum, across the entire section including the first section and the second section. In this manner, it becomes possible to determine the occurrence of engine-knocking appropriately.

In an engine-knocking determining device according to the fifth aspect, the section correcting unit 64 corrects a position of a boundary between the first section and the second section, based on the time difference threshold, by a time difference corresponding to ¼ a cycle of a pressure amplitude waveform. In this manner, it is possible to correct the first section and the second section appropriately.

An engine-knocking determining method according to a sixth aspect includes: a step of acquiring pressure amplitudes of the main-combustion chamber 22; a step of delimiting the pressure amplitudes acquired into the first section and the second section, the first section being a section prior to the maximum in-cylinder pressure and the second section being a section subsequent to the maximum in-cylinder pressure; a step determining whether knocking has occurred by comparing the first maximum amplitude of the pressure amplitude in the first section with the second maximum amplitude of the pressure amplitude in the second section. In other words, the pressure amplitudes in the first section represent vibrations without the effect of knocking, and the pressure amplitudes in the second section represent vibrations affected by knocking, when such knocking has occurred. By comparing the first maximum pressure amplitude of the pressure amplitude in the first section with the second maximum pressure amplitude of the pressure amplitude in the second section, the determining unit 55 can determine that knocking has occurred appropriately, with the effects of the torch jet removed from the first section and the second section. As a result, it is possible to improve knocking determination accuracy.

REFERENCE SIGNS LIST

10 Pre-chamber gas engine
11 Cylinder block
12 Cylinder head
13 Piston
21 Cylinder liner
22 Main-combustion chamber (main chamber)
23 Intake port
24 Exhaust port
25 Intake valve
26 Exhaust valve
31 Pre-chamber cap
32 Pre-combustion chamber (pre-chamber)
33 Orifice
34 Pre-chamber holder
35 Pre-chamber gas valve
36 Spark plug
40, 40A Knocking determining device
41 Crank angle sensor
42 In-cylinder pressure sensor
43 Engine control unit
51 Filter processing unit (pressure amplitude acquiring unit)
52 Section delimiting unit
53 First maximum amplitude calculating unit
54 Second maximum amplitude calculating unit
55 Determining unit
61 Time difference calculating unit
63 Determination error evaluating unit
64 Section correcting unit

The invention claimed is:

1. An engine-knocking determining device for a pre-chamber engine that causes combustion by discharging flame in a pre-chamber into a main chamber, the engine-knocking determining device comprising:

a pressure amplitude acquiring unit that acquires pressure amplitudes of the main chamber;

a section delimiting unit that delimits the pressure amplitudes acquired by the pressure amplitude acquiring unit into a first section prior to a maximum in-cylinder pressure and a second section subsequent to the maximum in-cylinder pressure; and a determining unit that determines whether knocking has occurred, by comparing a first maximum amplitude of the pressure amplitude in the first section with a second maximum amplitude of the pressure amplitude in the second section.

2. The engine-knocking determining device according to claim 1, wherein when a ratio between the first maximum amplitude and the second maximum amplitude is greater than a preset ratio threshold, the determining unit determines that knocking has occurred.

3. The engine-knocking determining device according to claim 2, further comprising a section correcting unit that corrects the first section and the second section in a case where a time difference between a timing at which the maximum in-cylinder pressure in the first section is reached and a timing at which the maximum in-cylinder pressure in the second section is reached is shorter than a preset time difference threshold when the ratio between the first maximum amplitude and the second maximum amplitude in the first section or the second section is equal to or lower than an amplitude threshold.

4. The engine-knocking determining device according to claim 3, wherein the time difference threshold is set to ½ a time difference between a timing of the maximum in-cylinder pressure and a timing of the minimum in-cylinder pressure across an entire section including the first section and the second section, the maximum in-cylinder pressure and the minimum in-cylinder pressure being pressures at which the pressure amplitude is at a maximum.

5. The engine-knocking determining device according to claim 3, wherein the section correcting unit corrects a position of a boundary between the first section and the second section, based on the time difference threshold, by a time difference corresponding to ¼ a cycle of a pressure amplitude waveform.

6. An engine-knocking determining method for a pre-chamber engine that causes combustion by discharging flame in a pre-chamber into a main chamber, the engine-knocking determining method comprising:

acquiring pressure amplitudes of the main chamber;

delimiting the pressure amplitudes acquired into a first section prior to a maximum in-cylinder pressure and a second section subsequent to the maximum in-cylinder pressure; and determining whether knocking has occurred, by comparing a first maximum amplitude of the pressure amplitude in the first section with a second maximum amplitude of the pressure amplitude in the second section.

* * * * *